United States Patent [19]

Karnes

[11] 4,327,934
[45] May 4, 1982

[54] SLIDE, PULL AND PARK BAR HITCH STRUCTURE

[76] Inventor: Trulen F. Karnes, 351 N. H St., Tulare, Calif. 93274

[21] Appl. No.: 179,088

[22] Filed: Aug. 18, 1980

[51] Int. Cl.³ .............................................. B62D 53/08
[52] U.S. Cl. ............................ 280/423 R; 280/438 R
[58] Field of Search ............... 280/423 R, 438 R, 482, 280/478 R, 405 R, 405 A

[56] References Cited
U.S. PATENT DOCUMENTS

| | | | |
|---|---|---|---|
| 3,392,992 | 7/1968 | Baker et al. | 280/423 R |
| 3,826,516 | 7/1974 | Weber | 280/423 R |
| 3,955,831 | 5/1976 | Whitchurch | 280/423 R |

Primary Examiner—Joseph F. Peters, Jr.
Assistant Examiner—Donn McGiehan

[57] ABSTRACT

This structure is designed for connecting a trailer vehicle and a pick-up truck, having a bed for the mounting of a fifth wheel platform, for receiving the fifth wheel pin extending from the front end of the trailer, and it consists primarily of a pair of vertical frames mounted alongside of the pick-up truck wheel wells. The frames include, in each, a forward and rearward sliding bar, which receives a horizontal member, to which is attached the fifth wheel platform, the structure's sliding bars enabling the pick-up truck and trailer to have an additional ten inches for maneuvering into a parking space at a trailer park.

3 Claims, 3 Drawing Figures

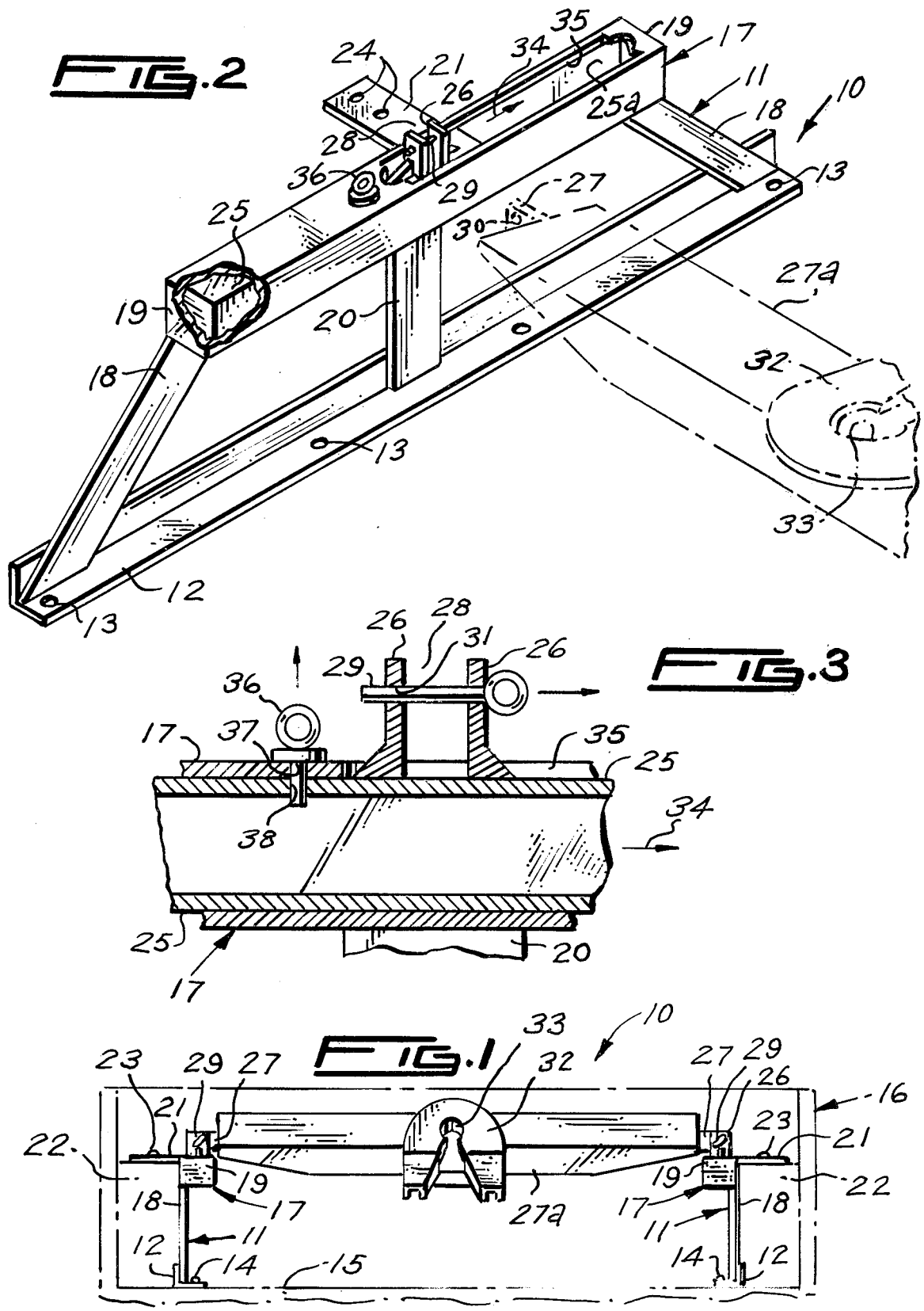

SLIDE, PULL AND PARK BAR HITCH STRUCTURE

This invention relates to hitch devices, and more particularly, to a slide, pull and park bar hitch structure.

It is, therefore, the principal object of this invention, to provide a slide, pull and park bar hitch structure, which will be of such design, that it will be adaptable for a short wheel base pick-up truck, so as to enable the driver to have ample room for turning while parking.

Another object of this invention is to provide a slide, pull and park bar hitch structure, which will have a slidable member in each of its frames, so as to enable it to have a forward position for pulling normally, and the rearward position of the slidable member which will enable the driver to have an additional ten inches in which to maneuver into a suitable parking space at a trailer park.

A further object of this invention is to provide a slide, pull and park bar hitch structure, which will have a removable fifth wheel platform secured between the two frames of the structure, for receiving the fifth wheel pin extending from the forward end of the trailer to be pulled.

Other objects are to provide a slide, pull and park bar hitch structure, which is simple in design, inexpensive to manufacture, rugged in construction, easy to use, and efficient in operation.

These, and other objects, will be readily evident, upon a study of the following specification, and the accompanying drawing, wherein:

FIG. 1 is a rear view of the present invention, which illustrates, in elevation, the rear end of a pick-up truck body fragmentary, and in phantom lines;

FIG. 2 is an enlarged perspective view of the right support frame of FIG. 1, shown partly broken away, and illustrates the fifth wheel platform bar fragmentary, in phantom, and removed from the mounting lugs of the frame, and FIG. 3 is a greatly enlarged and fragmentary side elevational view of FIG. 2.

According to this invention, device 10 is shown to include a pair of spaced-apart frames 11, having a bottom support member 12, of "L"-shaped configuration, which employs the use of spaced-apart openings 13, for receiving suitable fasteners 14, for fixedly securing member 12 to the top of bed 15 of pick-up truck body 16. A hollow member 17, of square cross-sectional configuration, is fixedly secured, in a suitable manner, to one end of a pair of angularly disposed support members, and the opposite ends of support members 18 are fixedly secured to the ends of bottom support member 12.

It shall be noted, that hollow member 17 is provided with an end wall 19 at each end, which serves to close the member 17, for purposes which hereinafter will be described.

A vertical brace member 20 is fixedly secured, in a suitable manner, at one end, to the center of member 17, and is secured fixedly, at its opposite end, to the center of bottom or support base member 12, thus providing for maximum strength.

A mounting bracket 21 is fixedly secured, in a suitable manner, to one side of hollow member 17, for mounting to the top of rear wheel well 22, extending upwards from the bed 15 of pick-up truck body 16. A pair of suitable fasteners 23 are received in openings 24 of bracket 21, so as to fixedly secure frame 11 to wheel well 22. A bar 25, of square cross-sectional configuration, is freely and slidably received in the hollow interior 25a of member 17, and it includes a pair of upwardly extending and spaced-apart lugs 26, which are fixedly secured thereto by suitable fastening means. A tongue 27, extending from each end of a horizontal bar 27a, is removably received in the space 28 between lugs 26 of the bars 19, received in the members 17 of the frames 11, and a clevis bolt 29 is received in the openings 30 of tongues 27, and the openings 31 of lugs 26, so as to hold bar 27a secure therein. A fifth wheel platform 32 (common in the art), is fixedly secured, in a suitable manner (not shown), to the top center of horizontal bar 27a, so as to removably receive, in the opening 33, the fifth wheel pin (not shown), extending from the front end of a trailer (not shown).

The forward movement of bar 25 in hollow member 17 is indicated by the arrow 34, and lugs 26 are freely and slidably received in the elongated slot 35, and end walls 19 serve to prevent any material, being loaded onto pick-up truck body, from accidentally being entered into the hollow members 17 of the pair of frames 11. A pin 36 is removably received in opening 37 of hollow member 17, and opening 38 through bar 25, so as to render the bars 25 stationary in the hollow members 17, when desired, the opening 37 being spaced apart from one end of the elongated slot.

In use, when horizontal bar 27a, with its fifth wheel platform 32, is in place within the lugs 26 of bars 25, and the bar 27a and the fifth wheel pin of the recreational vehicle or trailer is in place within fifth wheel platform 32 of bar 27a (the turn table assembly), the device 10, as shown in FIG. 2, with the pins 36 in the openings 37 and 38, is set for the forward or pulling position for travel. When the pins 36 are pulled out, and the brakes of the trailer are locked, and by pulling the pick-up truck forward, the bars 25 will slip backwards in members 17, for parking purposes. When the pins 36 are reinserted, the (turn table) platform 32 is then in position for providing enough turning radius for maneuverability.

While various changes may be made in the detail construction, it is understood that such changes will be within the spirit and scope of the present invention, as is defined by the appended claims.

What I now claim is:

1. A fifth wheel mounting structure for connecting a trailer and a pick-up truck, comprising, in combination, a pair of spaced-apart mounting frames secured to the bed of said pick-up truck, an elongated hollow member secured to each of said pair of frames, bar slidably received in each of said elongated hollow members, a mounting bracket secured to each of said pair of mounting frames, for securing the upper end of said pair of frames to the top of the rear wheel wells that extend upwards from said bed of said pick-up truck, a pin received in each of said bars and their respective said elongated hollow members, for rendering each of said bars stationary in each of said elongated hollow members when desired, and a clevis pin received in a pair of lugs secured to each of said bars, for securing the ends of a fifth wheel platform bar, which is on an axis transverse of the body of said pick-up truck.

2. The combination, according to claim 1, wherein said pair of mounting frames include a base member secured fixedly to the top of said bed of said pick-up truck by suitable fasteners, a pair of angularly disposed and oppositely opposed support members fixedly secured, in a suitable manner, at one end, to the top ends of each of said base members, and the opposite ends of said support members fixedly secured to the bottom ends of said elongated hollow members, and said pair of lugs are spaced apart, fixedly secured to each of said bars in said elongated hollow members, and extend from an elongated slot extending partially the longitudinal length through the top surfaces of each of said elongated hollow members, thus permitting the longitudinal sliding of said bars and secured lugs for changing the forward and rearward position of said fifth wheel platform bar, so as to enable parking said pick-up truck and attached trailer in a shorter space than otherwise possible.

3. The combination according to claim 2, wherein each end of the elongated slots included in each of said elongated hollow members serves as stop means against said pair of lugs, when they are in forward or rearward position, and the opening removably receiving said pin, which is also removably received in an opening included through said bar member, is spaced apart from one end of the elongated slot included in said elongated hollow member.

* * * * *